United States Patent
Kanai et al.

(10) Patent No.: US 10,598,215 B2
(45) Date of Patent: Mar. 24, 2020

(54) ELECTRIC MOTOR HAVING SEIZURE-RESISTANT DYNAMIC PRESSURE GAS BEARING

(71) Applicant: Nidec Copal Electronics Corporation, Tokyo (JP)

(72) Inventors: Takashi Kanai, Saitama (JP); Masatoshi Obayashi, Saitama (JP); Hiroki Matsushita, Saitama (JP)

(73) Assignee: Nidec Copal Electronics Corporation, Shinjuku-ku (JP)

( * ) Notice: Subject to any disclaimer, the term of this patent is extended or adjusted under 35 U.S.C. 154(b) by 476 days.

(21) Appl. No.: 15/325,133

(22) PCT Filed: Jul. 1, 2015

(86) PCT No.: PCT/JP2015/069044
§ 371 (c)(1),
(2) Date: Jan. 10, 2017

(87) PCT Pub. No.: WO2016/017364
PCT Pub. Date: Feb. 4, 2016

(65) Prior Publication Data
US 2017/0191523 A1 Jul. 6, 2017

(30) Foreign Application Priority Data
Jul. 29, 2014 (JP) .................. 2014-153990

(51) Int. Cl.
*F16C 17/10* (2006.01)
*F16C 21/00* (2006.01)
(Continued)

(52) U.S. Cl.
CPC ............ *F16C 17/107* (2013.01); *F16C 21/00* (2013.01); *H02K 7/083* (2013.01); *F16C 17/02* (2013.01); *F16C 19/02* (2013.01); *F16C 2380/26* (2013.01)

(58) Field of Classification Search
None
See application file for complete search history.

(56) References Cited

U.S. PATENT DOCUMENTS

2012/0049680 A1    3/2012    Saito
2014/0091660 A1    4/2014    Smirnov

FOREIGN PATENT DOCUMENTS

JP    2002-303338 A    10/2002
JP    2007-074767 A    3/2007
(Continued)

*Primary Examiner* — Jue Zhang
*Assistant Examiner* — Henry E Lee, III
(74) *Attorney, Agent, or Firm* — Howson & Howson LLP

(57) ABSTRACT

In a motor, a dynamic pressure gas bearing is prevented from seizing when the motor shaft and a sleeve contact each other. The number of rotations of a rotating body with respect to a case is maintained substantially constant both before and after contact. Auxiliary bearings are arranged in series with the gas bearing. A non-contact detent torque generation mechanism in parallel with the auxiliary bearings suppresses rotation in the auxiliary bearings. The sum of a predetermined detent torque generated by the torque generation mechanism during a rotation suppression time and the friction torque of the auxiliary bearings is smaller than the magnitude of an adhesion-time contact friction torque generated when the motor shaft and sleeve adhere to each other and is greater than the magnitude of a rotation-time viscous friction torque of the dynamic pressure gas bearing while the motor shaft and sleeve are spaced from each other.

9 Claims, 7 Drawing Sheets

(51) Int. Cl.
    *H02K 7/08*     (2006.01)
    *F16C 17/02*     (2006.01)
    *F16C 19/02*     (2006.01)

(56) References Cited

FOREIGN PATENT DOCUMENTS

| | | |
|---|---|---|
| JP | 57-1132 | 11/2011 |
| JP | 2011-236999 A | 11/2011 |

FIG.5

|  | NORMAL TIME | TRANSITION PERIOD | AFTER TRANSITION |
|---|---|---|---|
| THE NUMBER OF ROTATIONS N OF IMPELLER | N | N | N |
| THE NUMBER OF ROTATIONS Na IN DYNAMIC PRESSURE GAS BEARING | Na=N | N→N−Nb | Na=N−Nb |
| THE NUMBER OF ROTATIONS Nb IN BALL BEARINGS | 0 | 0→Nb | Nb |
| TORQUE TO ROTATE MOTOR SHAFT | Ta | Ta+Tsa | Ta |
| TORQUE TO BRAKE MOTOR SHAFT | N→N−Nb | Tb+Td | Tb |

ELECTRIC MOTOR HAVING SEIZURE-RESISTANT DYNAMIC PRESSURE GAS BEARING

FIELD OF THE INVENTION

The present invention relates to a motor which has a dynamic pressure gas bearing and in which a rotating body rotates at high speed, and specifically relates to a motor used in a fan instrument called a Sirocco fan or turbo blower.

BACKGROUND OF THE INVENTION

A conventional motor using a dynamic pressure gas bearing that supports a shaft by a sleeve is described in Japanese Laid-Open Patent 2014-073068 and shown particularly in FIG. 1 of that patent.

However, the above conventional motor has a structure in which the rotation of the shaft simply generates a dynamic pressure between an outer circumferential surface of the shaft and an inner circumferential surface of the sleeve to create a bearing rigidity.

Thus, when an external disturbance acts on the motor, for example, to cause the shaft and the sleeve to swing in a relative manner in a direction along which the rotation axis of the rotating body inclines and contact with each other, the contact friction of the dynamic pressure gas bearing increases, which could cause seizing of the dynamic pressure gas bearing such as adhesion and burning.

In order to maintain the rotation safely, another motor is known that has a sliding bearing, a rolling bearing provided at an outer side of the sliding bearing, and rotation regulating means for regulating the rotation of the rolling bearing until a rotation torque transmitted from the sliding bearing to the rolling bearing reaches or exceeds a standard rotation torque. An example of a motor designed to maintain safe rotation is the motor described in Japanese Laid-Open Utility Model No. S57-1132, particularly in FIGS. 1 to 3 and 6.

However, the above conventional rotation regulating means has a contact structure in which an elastic member and a connection member, which are attached to an outer annular member, abut on an inner annular member. Thus, there is a problem that the elastic member still abuts on the inner annular member at each rotation of the rolling bearing and may get broken even after the transmitted rotation torque exceeds the standard rotation torque and the rotation of the rolling bearing starts, or a problem that the connection member fractures when the transmitted rotation torque exceeds the standard rotation torque, causing the structure itself of the rotation regulating means to be broken.

SUMMARY OF THE INVENTION

The present invention has been achieved for addressing the above-described problems. That is, an object of the present invention is to provide a motor in which the dynamic pressure gas bearing is prevented from seizing, which is adhesion in the dynamic pressure gas bearing, when the motor shaft and the sleeve swing and contact each other due to an external disturbance acting on the motor to increase the contact friction torque of the dynamic pressure gas bearing, and in which the total number of rotations of a rotating body with respect to a case body is maintained substantially constant both before and after the occurrence of the swing and contact without causing the structure to be broken.

The invention of a first aspect for addressing the above-describe problems is a motor having a motor shaft that is rotatable with respect to a case body, a coil that is arranged in the case body and generates an magnetic force via energization, a magnet that generates a rotational force by means of an attraction/repulsion force acting between the coil and the magnet, and a dynamic pressure gas bearing that has a sleeve covering a circumference of the motor shaft, wherein auxiliary bearings for the dynamic pressure gas bearing are arranged in series with the dynamic pressure gas bearing, a non-contact detent torque generation mechanism for suppressing the rotation in the auxiliary bearings is arranged in parallel with the auxiliary bearing, and the sum of the magnitude of a predetermined detent torque generated by the non-contact detent torque generation mechanism during a rotation suppression time and the magnitude of a friction torque of the auxiliary bearings is set to be smaller than the magnitude of an adhesion-time contact friction torque generated when the motor shaft and the sleeve adhere to each other of a contact friction torque of the dynamic pressure gas bearing generated due to swing and contact of the motor shaft and the sleeve and is set to be greater than the magnitude of a rotation-time viscous friction torque of the dynamic pressure gas bearing while the motor shaft and the sleeve are spaced from each other.

In the present specification, "arranged in series" means that things in question are arranged in series along a path through which a torque is transmitted. Also, "arranged in parallel" means that things in question are arranged in parallel along a path through which a torque is transmitted.

The invention of a second aspect for further addressing the above-described problems is the motor of the invention of the first aspect, wherein the non-contact detent torque generation mechanism comprises an inner circumferential magnet whose poles switches in a circumferential direction of the motor shaft and an outer circumferential magnet whose poles switch in the circumferential direction and which is arranged outer than the inner circumferential magnet.

The invention of a third aspect for further addressing the above-described problems is the motor of the invention of the first aspect, wherein the auxiliary bearings are rolling bearings.

The invention of a fourth aspect for further addressing the above-described problems is the motor of the invention of any one of the first to third aspects, wherein, during the rotation suppression time, the motor shaft does not rotate with respect to the case body and the sleeve rotates with respect to the case body.

The invention of a fifth aspect for further addressing the above-described problems is the motor of the invention of the fourth aspect, wherein vibration absorbing O-rings for absorbing vibration of the motor shaft when the motor shaft rotates are respectively arranged between the case body and the auxiliary bearings.

Because the motor of the present invention has the motor shaft that is rotatable with respect to the case body, the coil that is arranged in the case body and generates an magnetic force via energization, the magnet that generates a rotational force by means of an attraction/repulsion force acting between the coil and the magnet, and the dynamic pressure gas bearing that has a sleeve covering a circumference of the motor shaft, at least one of the motor shaft and the sleeve can rotate at high speed as a rotating body. In addition, the motor of the present invention has the following unique effects.

According to the motor of the first aspect of the present invention, the auxiliary bearings for the dynamic pressure gas bearing are arranged in series with the dynamic pressure gas bearing, the non-contact detent torque generation mechanism for suppressing rotation in the auxiliary bearing is arranged in parallel with the auxiliary bearing, and the sum of the magnitude of a predetermined detent torque generated by the non-contact detent torque generation mechanism during a rotation suppression time and the magnitude of a friction torque of the auxiliary bearing is set to be smaller than the magnitude of an adhesion-time contact friction torque generated when the motor shaft and the sleeve adhere to each other of a contact friction torque of the dynamic pressure gas bearing generated due to swing and contact of the motor shaft and the sleeve and is set to be greater than the magnitude of a rotation-time viscous friction torque of the dynamic pressure gas bearing while the motor shaft and the sleeve are spaced from each other. Thus, the sum of the contact friction torque and the rotation-time viscous friction torque of the dynamic pressure gas bearings becomes greater than the sum of the predetermined detent torque during a rotation suppression time and the friction torque of the auxiliary bearings before seizing such as adhesion and burning occurs in the dynamic pressure gas bearing as the motor shaft and the sleeve swing and contact with each other due to an external disturbance acting on the motor, for example, and the contact friction torque of dynamic pressure gas bearing increases, and the contact friction torque is transmitted to the auxiliary bearings to start not only the rotation in the dynamic pressure gas bearing but also the rotation in the auxiliary bearings. Therefore, the total number of rotations of the rotating body with respect to the case body can be maintained substantially constant both before and after the occurrence of the swing and contact without causing fatal damage to the dynamic pressure gas bearing. Also, because the detent torque generation mechanism is a non-contact type, breakage of the structure can be avoided even when the rotation in the auxiliary bearings starts.

According to the motor of the second aspect of the present invention, the non-contact detent torque generation mechanism includes the inner circumferential magnet whose poles switches in the circumferential direction of the motor shaft and the outer circumferential magnet whose poles switch in the circumferential direction and which is arranged outer than the inner circumferential magnet. Thus, an attraction force acting between the inner circumferential magnet and the outer circumferential magnet becomes the predetermined detent torque during a rotation suppression time before the rotation in the auxiliary bearings starts, and an attraction force and a repulsion force act in an alternate manner between the inner circumferential magnet and the outer circumferential magnet while the rotation in the auxiliary bearing continues, which makes an average torque per rotation zero. Therefore, the loss due to the detent torque while the rotation in the auxiliary bearing continues can be made to zero. In other words, because the detent torque changes in accordance with the relative angle between the inner circumferential magnet and the outer circumferential magnet and does not change in accordance with rotation speed, the loss due to the detent torque while the rotation in the auxiliary bearings continues can be made to zero.

According to the motor of the third aspect of the present invention, the auxiliary bearings are rolling bearings. Thus, the auxiliary bearings do not deteriorate rapidly and seizing is less likely to occur. Therefore, the rotation in the auxiliary bearings can be reliably started when the sum of the contact friction torque and the rotation-time viscous friction torque of the dynamic pressure gas bearing becomes greater than the sum of the predetermined detent torque during a rotation suppression time and the friction torque of the auxiliary bearing.

According to the motor of the fourth aspect of the present invention, the motor is a sleeve rotation-type motor in which the motor shaft does not rotate with respect to the case body and the sleeve rotates with respect to the case body during a rotation suppression time. Thus, the size of the auxiliary bearings are smaller in comparison with those in a shaft rotation-type motor in which the sleeve does not rotate with respect to the case body and the motor shaft rotates with respect to the case body while the non-contact detent torque generation mechanism is suppressing the rotation in the auxiliary bearings. Therefore, the friction torque of the auxiliary bearings can be made smaller in accordance with the smaller size of the auxiliary bearings to reduce the loss due to the auxiliary bearings. Also, because the auxiliary bearings do not need to have a high bearing rigidity, they can be made smaller so that the increase in the total weight of the motor can be kept to the minimum.

According to the motor of the fifth aspect of the present invention, the vibration absorbing O-rings for absorbing vibration of the motor shaft when the motor shaft rotates are respectively arranged between the case body and the auxiliary bearings. Thus, vibration of the motor shaft when the motor shaft rotates is absorbed. Therefore, noise due to the vibration of the motor shaft can be reduced.

BRIEF DESCRIPTION OF THE DRAWINGS

FIG. 5 is a diagram illustrating the changes of the number of rotations in a dynamic pressure gas bearing, the number of rotations in the ball bearings, and torques before and after the motor shaft and the sleeve swing and contact with each other.

DETAILED DESCRIPTION OF THE PREFERRED EMBODIMENTS

Figure 1:
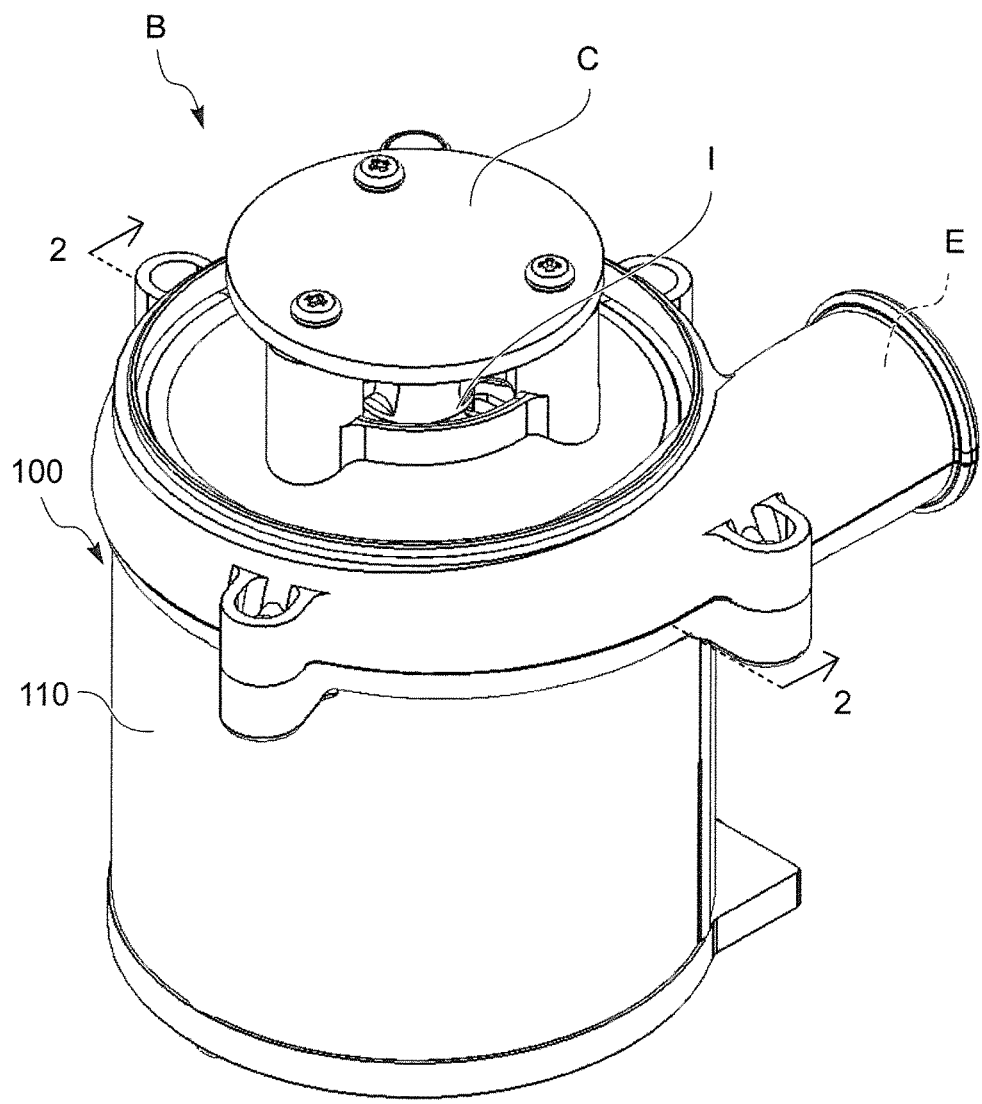
FIG. 1 is a perspective view of a fan instrument using a motor that is a first embodiment of the present invention.

The detail of a specific embodiment of the present invention does not matter as long as the embodiment is a motor having a motor shaft that is rotatable with respect to a case body, a coil that is arranged in the case body and generates an magnetic force via energization, a magnet that generates a rotational force by means of an attraction/repulsion force acting between the coil and the magnet, and a dynamic pressure gas bearing that has a sleeve covering a circumference of the motor shaft, wherein auxiliary bearings for the dynamic pressure gas bearing are arranged in series with the dynamic pressure gas bearing, a non-contact detent torque generation mechanism for suppressing rotation in the auxiliary bearing is arranged in parallel with the auxiliary bearing, and the sum of the magnitude of a predetermined detent torque generated by the non-contact detent torque generation mechanism during a rotation suppression time and the magnitude of a friction torque of the auxiliary bearing is set to be smaller than the magnitude of an adhesion-time contact friction torque generated when the motor shaft and the sleeve adhere to each other of a contact friction torque of the dynamic pressure gas bearing generated due to swing and contact of the motor shaft and the sleeve and is set to be greater than the magnitude of a rotation-time viscous friction torque of the dynamic pressure gas bearing while the motor shaft and the sleeve are spaced from each other, so that the total number of rotations of the rotating body with respect to the case body can be maintained substantially constant both before and after the occurrence of the swing and contact of the motor shaft and the sleeve due to an external disturbance acting on the motor, for example, and so that breakage of the structure can be avoided even when the rotation in the auxiliary bearings starts.

For example, the motor may be a so-called sleeve rotation-type motor in which not a motor shaft but a sleeve rotates in a dynamic pressure gas bearing during a normal rotation time before an external disturbance acts on the motor, or a so-called shaft rotation-type motor in which not a sleeve but a motor shaft rotates. Also, the motor may be any motor that rotates at high speed, including a brushless DC (direct-current) motor and an AC (alternating-current) motor. The auxiliary bearings may be any type of a contact bearing, including a rolling bearing such as a ball bearing, a sliding bearing that is in plane or line contact with a shaft, and a pivot bearing that is in nearly point contact with a shaft.

The non-contact detent torque generation mechanism may be any type of a non-contact detent torque generation mechanism, including the one that generates a detent torque by using a magnetic force of permanent magnets and the one that generates a detent torque by using a magnetic force of electric magnets.

It is desirable that, after the rotation in the auxiliary bearings starts, the detent torque changes like a sine wave in accordance with the relative angle (position) of the magnets and an average detent torque per rotation becomes zero.

Figure 2:
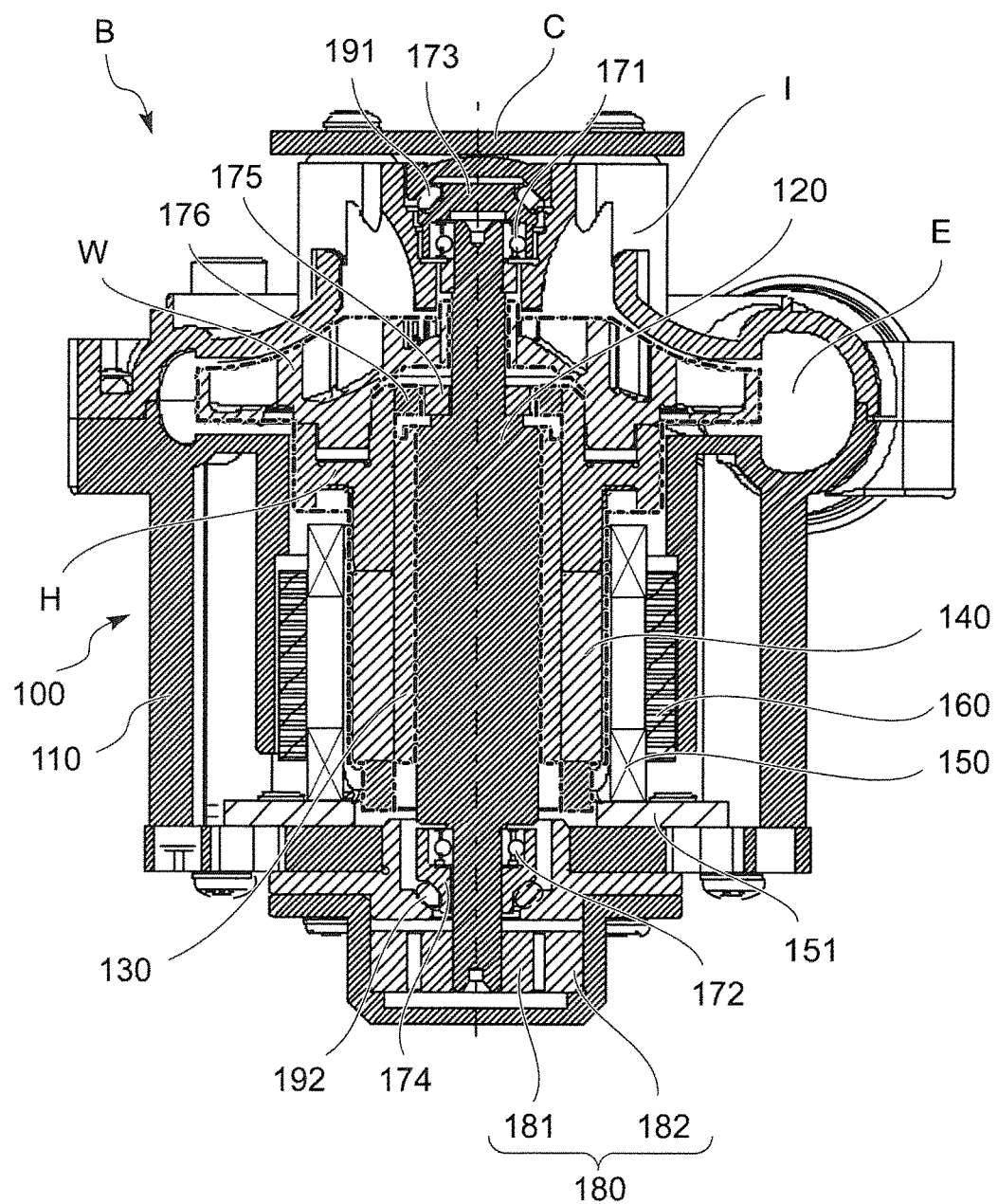
FIG. 2 is a sectional side view, as seen in reference plane 2-2 indicated in FIG. 1, which illustrates the rotation in a state where a motor shaft and a sleeve are spaced from each other.
Figure 3:
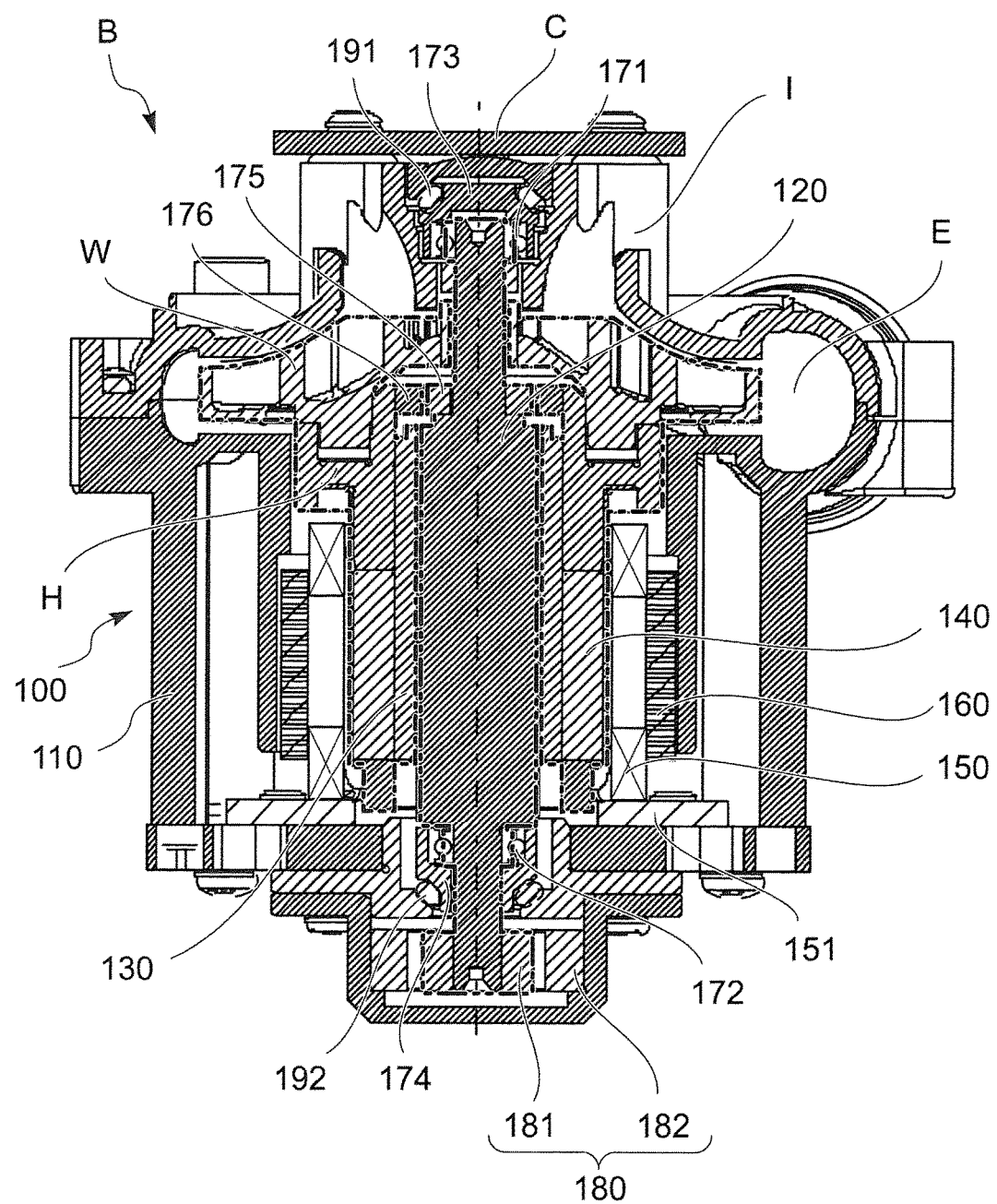
FIG. 3 is a sectional side view illustrating the rotation in a state where the sum of a contact friction torque and a rotation-time viscous friction torque becomes greater than the sum of a predetermined detent torque during a rotation suppression time and a friction torque of ball bearings.
Figure 4:
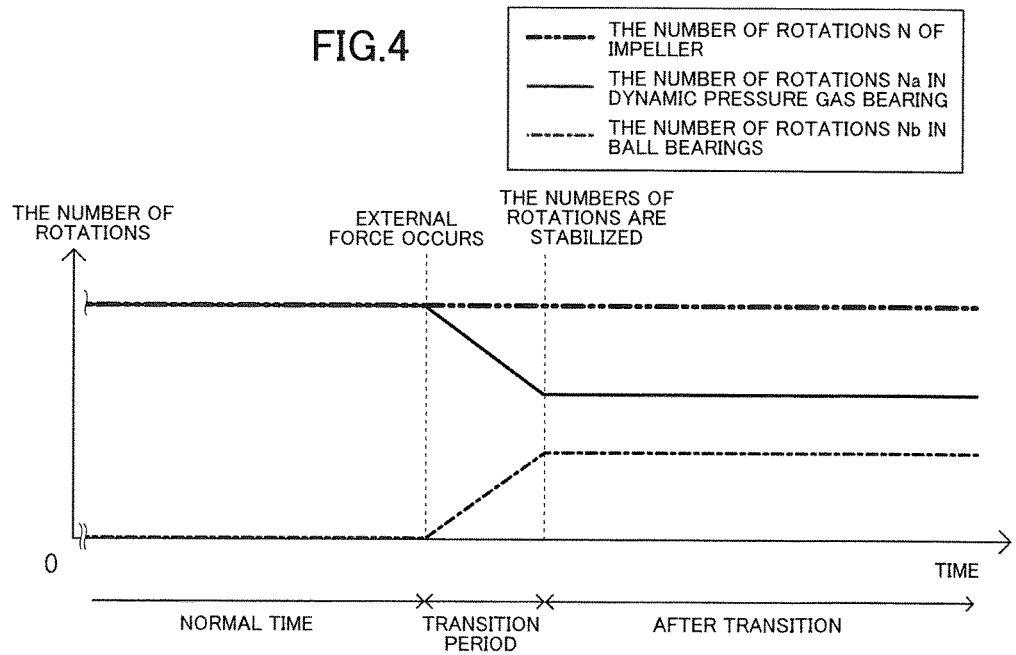
FIG. 4 is a diagram illustrating the change of the number of rotations in a dynamic pressure gas bearing and the number of rotations in the ball bearings before and after the motor shaft and the sleeve swing and contact with each other.
Figure 6A:
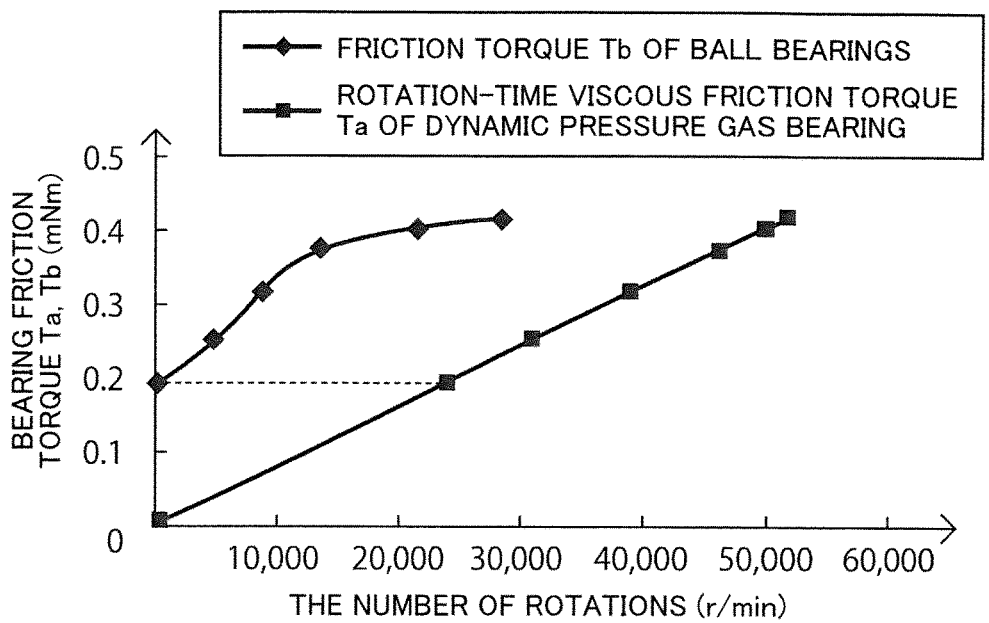
FIG. 6A is a diagram illustrating the relationship between the rotation-time viscous friction torque of the dynamic pressure gas bearing, the friction torque of the ball bearings, and the number of rotations.
Figure 6B:
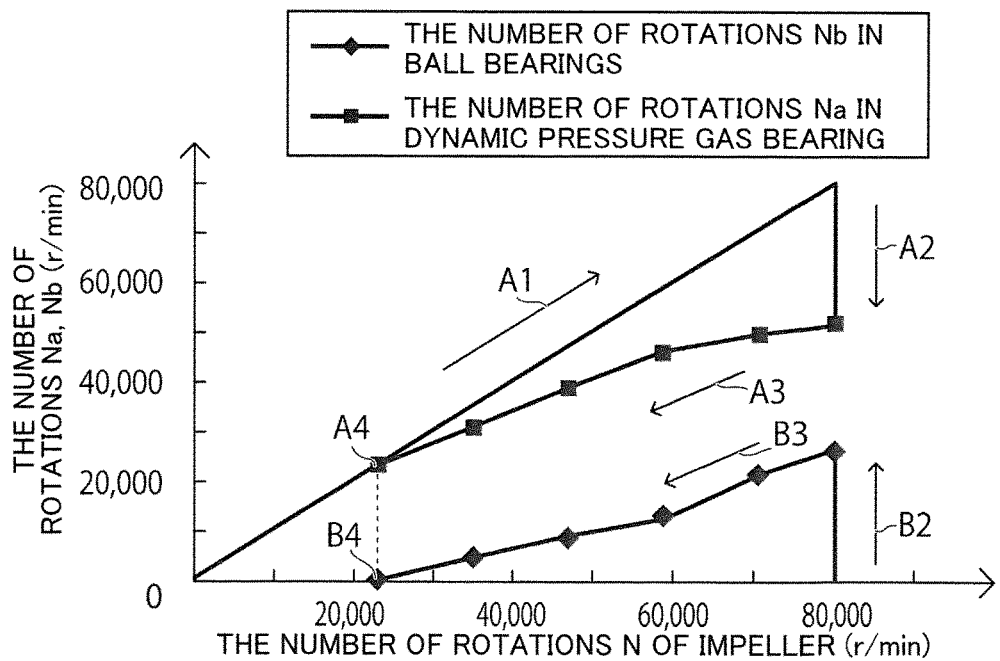
FIG. 6B is a diagram illustrating the relationship between the number of rotations of an impeller, the number of rotations in the dynamic pressure gas bearing, and the number of rotations in the ball bearings.

A fan instrument B using a motor 100 that is a first embodiment of the present invention will now be described on the basis of FIGS. 1 to 6A and 6B. Here, FIG. 1 is a perspective view of the fan instrument B using the motor 100 that is the first embodiment of the present invention. FIG. 2 is a sectional side view as seen in reference numerals 2-2 indicated in FIG. 1, which illustrates the rotation in a state where a motor shaft 120 and a sleeve 130 are spaced from each other. FIG. 3 is a sectional side view illustrating the rotation in a state where the sum of a contact friction torque Tsa and a rotation-time viscous friction torque Ta becomes greater than the sum of a predetermined detent torque Td during a rotation suppression time and a friction torque Tb of ball bearings 171, 172. FIG. 4 is a diagram illustrating the change of the number of rotations in the sleeve 130, which is a dynamic pressure gas bearing, and the number of rotations in the ball bearings 171, 172 before and after the motor shaft 120 and the sleeve 130 swing and contact with each other. FIG. 5 is a diagram illustrating the changes of the number of rotations in the sleeve 130, which is the dynamic pressure gas bearing, the number of rotations in the ball bearings 171, 172, and torques before and after the motor shaft 120 and the sleeve 130 swing and contact with each other. FIG. 6A is a diagram illustrating the relationship between the rotation-time viscous friction torque Ta of the dynamic pressure gas bearing, the friction torque Tb of the ball bearings 171, 172, and the number of rotations. FIG. 6B is a diagram illustrating the relationship between the number of rotations N of an impeller W, the number of rotations Na in the sleeve 130, which is the dynamic pressure gas bearing, and the number of rotations Nb in the ball bearings 171, 172.

As illustrated in FIGS. 1 and 2, the fan instrument B includes the motor 100, a hub H, the impeller W, an air suction inlet I, an air exhaustion outlet E, and a cover plate C. The motor 100 as the first embodiment is a sleeve rotation-type motor in which the sleeve 130 rotates with respect to the motor shaft 120 in the interior of a case body 110. The hub H is integrally fitted to the sleeve 130, which is a rotor. The impeller W is integrally fitted to the sleeve 130 via the hub H, and the motor shaft 120 is rotatably inserted into the impeller W. In FIG. 1, the air suction inlet I is provided at an upper central portion of the case body 110 of the motor 100, and the air exhaustion outlet E is provided at a side portion of the case body 110. Due to the high-speed rotation of the impeller W, external air is sucked into an internal impeller chamber via the air suction inlet I, which increases the pressure within the impeller chamber. The air in the impeller chamber is then emitted from the air exhaustion outlet E. As illustrated in FIG. 1, the cover plate C is arranged upward of the air suction inlet I so as to be spaced from the air suction inlet I for preventing entry of foreign matters, for example.

Next, the motor 100 will be described in detail. The motor 100 includes the case body 110, the motor shaft 120, the sleeve 130 as a dynamic pressure gas bearing, a rotor magnet 140 as a magnet, a coil 150 that generates a magnetic force via energization, a yoke 160 as an insulation core, the ball bearings 171, 172 as auxiliary bearings, and a non-contact detent torque generation mechanism 180 for suppressing the rotation in the ball bearings 171, 172. The sleeve 130 is arranged around the motor shaft 120 with a tiny clearance created therebetween.

Due to the grooves formed on either an inner circumferential surface of the sleeve 130 or an outer circumferential surface of the motor shaft 120 in a herringbone pattern, for example, a dynamic pressure occurs between the outer circumferential surface of the motor shaft 120 and the inner circumferential surface of the sleeve 130 via relative rotation of the motor shaft 120 and the sleeve 130 so that a bearing rigidity is created. The rotor magnet 140 is made of a permanent magnet and is configured to fit to an outer circumference of the sleeve 130 so as to integrally rotate with the sleeve 130. The coil 150 is arranged as a stator at an outer circumference of the rotor magnet 140 so as to face the rotor magnet 140. Also, the coil 150 is attached to a base plate 151 and is configured to generate a magnetic force via energization. The yoke 160 is arranged at an outer circumference of the coil 150.

The two ball bearings 171, 172 as auxiliary bearings are arranged in series with the sleeve 130, which is a dynamic pressure gas bearing, along a path through which a torque is transmitted. Specifically, as illustrated in FIG. 2, the ball bearing 171 is held by a bearing holder 173 and rotatably supports an upper end of the motor shaft 120. Also, the bearing holder 173 is attached to the case body 110 via a vibration absorbing O-ring 191 made of an elastic material. Similarly, as illustrated in FIG. 2, the ball bearing 172 is held by a bearing holder 174 and rotatably supports a lower end of the motor shaft 120. Also, the bearing holder 174 is attached to the case body 110 via a vibration absorbing O-ring 192 made of an elastic material.

The non-contact detent torque generation mechanism 180 is arranged in parallel with the ball bearings 171, 172 as auxiliary bearings along a path through which a torque is transmitted. Specifically, the non-contact detent torque generation mechanism 180 includes an movable-side annular magnet 181 as an inner circumferential magnet whose poles switch in a circumferential direction of the motor shaft 120 and a fixed-side annular magnet 182 as an outer circumferential magnet whose poles switch in the circumferential direction and which is arranged outer than the movable-side annular magnet 181. As illustrated in FIG. 2, the movable-side annular magnet 181 fits to a lower end of the motor shaft 120 so as to integrally rotate with the motor shaft 120. The fixed-side annular magnet 182 is attached to the case body 110 at a position facing the movable-side annular magnet 181. Due to an attraction force acting between the movable-side annular magnet 181 and the fixed-side annular magnet 182, the rotation in the ball bearings 171, 172 is suppressed.

Also, an inner thrust magnet 175 is fitted to an upper end side of the motor shaft 120 so as to integrally rotate with the motor shaft 120. An outer thrust magnet 176 is arranged at an outer circumferential side of the inner thrust magnet 175 so as to face the inner thrust magnet 175. The outer thrust magnet 176 integrally rotates with the hub H. Due to an attraction force acting between the inner thrust magnet 175 and the outer thrust magnet 176, the relative positional relationship between the motor shaft 120 and the sleeve 130 in a thrust direction is stabilized.

When the coil 150 generates a magnetic force due to energization and creates a rotational force in cooperation with the rotor magnet 140, the sleeve 130, the rotor magnet 140, the hub H, the impeller W, and the outer thrust magnet 176 rotate as a first rotor, as illustrated in FIG. 2 with the thick alternate long and short dashes line. Here, the magnitude of the sum of the predetermined detent torque Td generated by the non-contact detent torque generation mechanism 180 during a rotation suppression time and the friction torque Tb of the ball bearings 171, 172 is set to be greater than the magnitude of the rotation-time viscous friction torque Ta of the dynamic pressure gas bearing while the motor shaft 120 and the sleeve 130 are spaced from each other. Thus, the motor shaft 120 does not rotate yet.

Here, suppose that an external disturbance acts on the motor 100 for some reason and the motor shaft 120 and the sleeve 130 relatively swing and contact with each other. Then the contact friction torque Tsa of the dynamic pressure gas bearing occurs and increases. Here, the magnitude of the sum of the predetermined detent torque Td generated by the non-contact detent torque generation mechanism 180 during a rotation suppression time and the friction torque Tb of the ball bearings 171, 172 is set to be smaller than the magnitude of an adhesion-time contact friction torque Tka generated when the motor shaft 120 and the sleeve 130 adhere to each other of the contact friction torque Tsa of the dynamic pressure gas bearing generated due to the swing and contact of the motor shaft 120 and the sleeve 130. Thus, as illustrated in FIGS. 3 to 5, the sum of the contact friction torque Tsa and the rotation-time viscous friction torque Ta of the dynamic pressure gas bearing becomes greater than the sum of the predetermined detent torque Td during a rotation suppression time and the friction torque Tb of the ball bearings 171, 172 before seizing such as burning and adhesion occurs in the dynamic pressure gas bearing, allowing the contact friction torque Tsa to be transmitted to the ball bearings 171, 172, which starts the rotation in the ball bearings 171, 172 in addition to the rotation in the dynamic pressure gas bearing. In other words, as illustrated in FIG. 3 with the thick alternate long and two short dashes line, the motor shaft 120, inner diameter sides of the ball bearings 171, 172, the movable-side annular magnet 181, and the inner thrust magnet 175 start rotating as a second rotor by receiving the contact friction torque Tsa from the first rotor consisting of the sleeve 130, the rotor magnet 140, the hub H, the impeller W, and the outer thrust magnet 176.

If the sum of the contact friction torque Tsa and the rotation-time viscous friction torque Ta of the dynamic pressure gas bearing is less than the sum of the predetermined detent torque Td during a rotation suppression time and the friction torque Tb of the ball bearings 171, 172 when the motor shaft 120 and the sleeve 130 contact with each other, substantially no rotation occurs in the ball bearings 171, 172 (actually, less than a half rotation occurs at the moment of the contact) and only the first rotor consisting of the sleeve 130, the rotor magnet 140, the hub H, the impeller W, and the outer thrust magnet 176 continues rotating, as illustrated in FIG. 2 with the thick alternate long and short dashes line. This is because seizing does not possibly occur.

As illustrated in FIGS. 4 and 5, a transition period when the sum of the contact friction torque Tsa and the rotation-time viscous friction torque Ta of the dynamic pressure gas bearing becomes greater than the sum of the predetermined detent torque Td during a rotation suppression time and the friction torque Tb of the ball bearings 171, 172 is as short as tens of milliseconds. This is because the motor shaft 120 and the sleeve 130 become spaced from each other again to make the contact friction torque Tsa of the dynamic pressure gas bearing zero, the detent torque Td generated by the movable-side annular magnet 181 and the fixed-side annular magnet 182 changes like a sine wave in accordance with the relative angle (position) of the movable-side annular magnet 181 and the fixed-side annular magnet 182 as the movable-side annular magnet 181 and the fixed-side annular magnet 182 repeat attraction and repulsion via the relative rotation thereof, an average detent torque per rotation after the start of the rotation in the ball bearings 171, 172 becomes zero, the rotation-time viscous friction torque Ta of the dynamic pressure gas bearing is balanced with the friction torque Tb of the ball bearings 171, 172, and the number of rotations Na in the sleeve of the dynamic pressure gas bearing and the number of rotations Nb in the ball bearings 171, 172 immediately become constant.

During the transition period, the number of rotations Nb in the ball bearings 171, 172 occurs and increases to Nb due to the contact friction torque Tsa, and the number of rotations Na in the dynamic pressure gas bearing decreases to N-Nb due to the contact friction torque Tsa. However, the number of rotations N of the impeller W hardly changes because it is the sum of the number of rotations N-Nb in the dynamic pressure gas bearing and the number of rotations Nb in the ball bearings 171, 172. Even after the transition, the number of rotations N of the impeller W does not change because it is the sum of the number of rotations N-Nb in the dynamic pressure gas bearing and the number of rotations Nb in the ball bearings 171, 172. In other words, after the rotation in the ball bearings 171, 172 starts, the average detent torque per rotation generated by the movable-side annular magnet 181 and the fixed-side annular magnet 182 becomes zero and no loss occurs. Thus, the number of rotations N of the impeller W becomes substantially constant without any change both before and after the occurrence of the swing and contact.

Here, the reason why the number of rotations Na in the dynamic pressure gas bearing is greater than the number of rotations Nb in ball bearings 171, 172 after the transition as illustrated in FIG. 4 is that the dynamic pressure gas bearing and the ball bearings 171, 172 are based on the relationship between the rotation-time viscous friction torque Ta of the dynamic pressure gas bearing, the friction torque Tb of the ball bearings 171, 172, and the number of rotations illustrated in FIG. 6A. In other words, after the transition, because the rotation-time viscous friction torque Ta of the dynamic pressure gas bearing is balanced with the friction torque Tb of the rotation-time viscous friction torque Ta, the number of rotations Na and the number of rotations Nb respectively corresponding to these torques are achieved.

In the present embodiment, auxiliary bearings are the ball bearings 171, 172, which are one example of a rolling bearing. Thus, rapid degradation is prevented and seizing hardly occurs. That is, in addition to the rotation in the ball bearings 171, 172 that reliably starts when the sum of the contact friction torque Tsa and the rotation-time viscous friction torque Ta of the dynamic pressure gas bearing becomes greater than the sum of the predetermined detent torque Td during a rotation suppression time and the friction torque Tb of the ball bearings 171, 172, balls in the ball bearings 171, 172 also roll. Thus, seizing hardly occurs in the first place.

Also, generally speaking, when the magnitude of the friction torque Tb of the ball bearings 171, 172 is balanced with the magnitude of the rotation-time viscous friction torque Ta (friction torque) of the dynamic pressure gas bearing, the number of rotations Nb in the ball bearings 171, 172 is smaller than the number of rotations Na in the dynamic pressure gas bearing. means that a master-servant relationship, where the dynamic pressure gas bearing is the master and the ball bearings 171, 172 are the slave, is maintained.

Also, in the present embodiment, the motor is a so-called sleeve rotation-type motor in which the motor shaft 120 does not rotate with respect to the case body 110 and the sleeve 130 rotates with respect to the case body 110 during a rotation suppression time. Thus, in comparison with a shaft rotation-type motor, the ball bearings 171, 172 are smaller. This means that, in comparison with a shaft rotation-type motor, the friction torque Tb of the ball bearings 171, 172 becomes smaller.

Also, in the present embodiment, vibration absorbing O-rings 191, 192 are arranged between the case body 110 and the ball bearings 171, 172 for absorbing vibrations of the motor shaft 120 when the motor shaft rotates. Thus, vibrations of the motor shaft 120 are absorbed when the motor shaft 120 also rotates. This means that noise due to the vibration of the motor shaft 120 is reduced.

Next, a sequence of actions until the recovery completes will be described. As illustrated in FIG. 6B with the arrow A1, when electric current is applied to the coil 150, the first rotor consisting of the sleeve 130, the rotor magnet 140, the hub H, the impeller W, and the outer thrust magnet 176 initially starts rotating (this state is illustrated in FIG. 2) and the number of rotations N of the impeller W increases to the predetermined number of rotations of 80,000 rpm, for example. In other words, in the dynamic pressure gas bearing, the first rotor starts rotating and the number of rotations N of the impeller W increases to the predetermined number of rotations of 80,000 rpm.

Then, when an external disturbance acts on the motor 100 and the motor shaft 120 and the sleeve 130 relatively swing and contact with each other, causing the contact friction torque Tsa of the dynamic pressure gas bearing to occur and increase, the sum of the contact friction torque Tsa and the rotation-time viscous friction torque Ta of the dynamic pressure gas bearing becomes greater than the sum of the predetermined detent torque Td during a rotation suppression time and the friction torque Tb of the ball bearings 171, 172 before seizing such as burning or adhesion occurs in the dynamic pressure gas bearing. Then, while the number of rotations Na in the dynamic pressure gas bearing decreases to 51,000 rpm as illustrated with the arrow A2, the number of rotations Nb in the ball bearings 171, 172 increases to 29,000 rpm as illustrated with the arrows B2 because the contact friction torque Tsa is transmitted to the ball bearings 171, 172 and the rotation in the ball bearings 171, 172 starts in addition to the rotation in the dynamic pressure gas bearing (this state is illustrated in FIG. 3). Even though the first rotor and the second rotor may continue rotating, it is desirable to return to the state in which only the first rotor rotates, because the ball bearings 171, 172 are auxiliary bearings.

Thus, by controlling the electric current to the coil 150, the number of rotations N of the impeller W is decreased so that the number of rotations Na in the dynamic pressure gas bearing and the number of rotations Nb in the ball bearings 171, 172 are decreased, as illustrated with the arrows A3 and B3. During this stage, the inclinations of the curved lines of the number of rotations Na in the dynamic pressure gas bearing and the number of rotations Nb in the ball bearings 171, 172 illustrated in FIG. 6B respectively change in accordance with the relationship between the number of rotations and the friction torque illustrated in FIG. 6A. This means that the number of rotations Na in the dynamic pressure gas bearing and the number of rotations Nb in the ball bearings 171, 172 decrease while the rotation-time viscous friction torque Ta of the dynamic pressure gas bearing is balanced with the friction torque Tb of the ball bearings 171, 172.

Then, the electric current to the coil 150 is controlled to decrease the number of rotations N of the impeller W until at least the number of rotations Nb in the ball bearings 171, 172 becomes zero at A4, B4. The state in which only the first rotor rotates, as illustrated in FIG. 2, is then recovered.

Whether the number of rotations Nb in the ball bearings 171, 172 became zero may be determined from the number of rotations N of impeller W, or may be determined by providing a sensor that detects the rotation in the ball bearings 171, 172. Then, as needed, the electric current to the coil 150 is controlled to increase the number of rotations N of the impeller W, as illustrated with the arrows A1. Although the electric current to the coil 150 is controlled to decrease the number of rotations N of the impeller W for recovering the state in which only the first rotor rotates as illustrated with the arrows A3 and B3, it is also possible to stop the rotation of impeller W completely and then rotate the impeller W again as illustrated with the arrow A1. Also, if the non-contact detent torque generation mechanism 180 uses not permanent magnets but electric magnets, the attraction force of the electric magnets may be increased to make the number of rotations Nb in the ball bearings 171, 172 zero for recovering the state and then the attraction force of the electric magnets may be returned to the original magnitude.

It is also possible to configure the non-contact detent torque generation mechanism 180 with permanent magnets and at the same time to provide another non-contact detent torque generation mechanism (not shown) consisting of electric magnets for braking the ball bearings 171, 172. In this case, the another non-contact detent torque generation mechanism consisting of electric magnets needs to generate an electromagnetic force only when the number of rotations Nb needs to be set to zero. Thus, energization of the electric magnets can be kept to the minimum.

As described above, the motor 100 as the first embodiment of the present invention is obtained, wherein the ball bearings 171, 172, which are one example of auxiliary bearings for the dynamic pressure gas bearing, are arranged in series with the dynamic pressure gas bearing, the non-contact detent torque generation mechanism 180 for suppressing the rotation in the ball bearings 171, 172 is arranged in parallel with the ball bearings 171, 172, the sum of the magnitude of the predetermined detent torque Td generated by the non-contact detent torque generation mechanism 180 during a rotation suppression time of and the magnitude of the friction torque Tb Of the ball bearings 171, 172 is set to be smaller than the magnitude of the adhesion-time contact friction torque Tka generated when the motor shaft 120 and the sleeve 130 adhere to each other of the contact friction torque Tsa of the dynamic pressure gas bearing generated due to swing and contact of the motor shaft 120 and the sleeve 130 and is set to be greater than the magnitude of the rotation-time viscous friction torque Ta of the dynamic pressure gas bearing while the motor shaft 120 and the sleeve 130 are spaced from each other. Thus, the number of rotations N of the impeller W, which is the total number of rotations of the rotating body with respect to the case body 110, can be maintained substantially constant without any change both before and after the occurrence of the swing and contact, and breakage of the structure can be avoided even after the rotation in the ball bearings 171, 172 starts.

Also, because the non-contact detent torque generation mechanism 180 includes the movable-side annular magnet 181 as an inner circumferential magnet whose poles switch in a circumferential direction of the motor shaft 120 and the fixed-side annular magnet 182 as an outer circumferential magnet whose poles switch in the circumferential direction and which is arranged outer than the movable-side annular magnet 181, an attraction force and a repulsion force act in an alternate manner between the movable-side annular magnet 181 and the fixed-side annular magnet 182 while the rotation in the ball bearings 171, 172 continues, which makes an average torque per rotation zero. Thus, the loss due to the detent torque Td while the rotation in the ball bearings 171, 172 continues can be made to zero.

Also, because the auxiliary bearing are the ball bearings 171, 172, which are one example of a rolling bearing, the rotation in the ball bearings 171, 172 can be reliably started when the sum of the contact friction torque Tsa and the rotation-time viscous friction torque Ta of the dynamic pressure gas bearing becomes greater than the sum of the predetermined detent torque Td during a rotation suppression time and the friction torque Tb of the ball bearings 171, 172, and a master-servant relationship, where the dynamic pressure gas bearing is the master and the ball bearings 171, 172 are the slave, can be maintained.

Also, because the motor is a sleeve rotation-type motor in which the motor shaft 120 does not rotate with respect to the case body 110 and the sleeve 130 rotates with respect to the case body 110 during a rotation suppression time, the friction torque Tb of the ball bearings 171, 172 can be made smaller in comparison with a shaft rotation-type motor so that the loss due to the ball bearings 171, 172 can be reduced.

Also, because the vibration absorbing O-rings 191, 192 for absorbing vibrations of the motor shaft 120 when the motor shaft 120 rotates are respectively arranged between the case body 110 and the ball bearings 171, 172, noise due to the vibration of the motor shaft 120 can be reduced.

Figure 7:
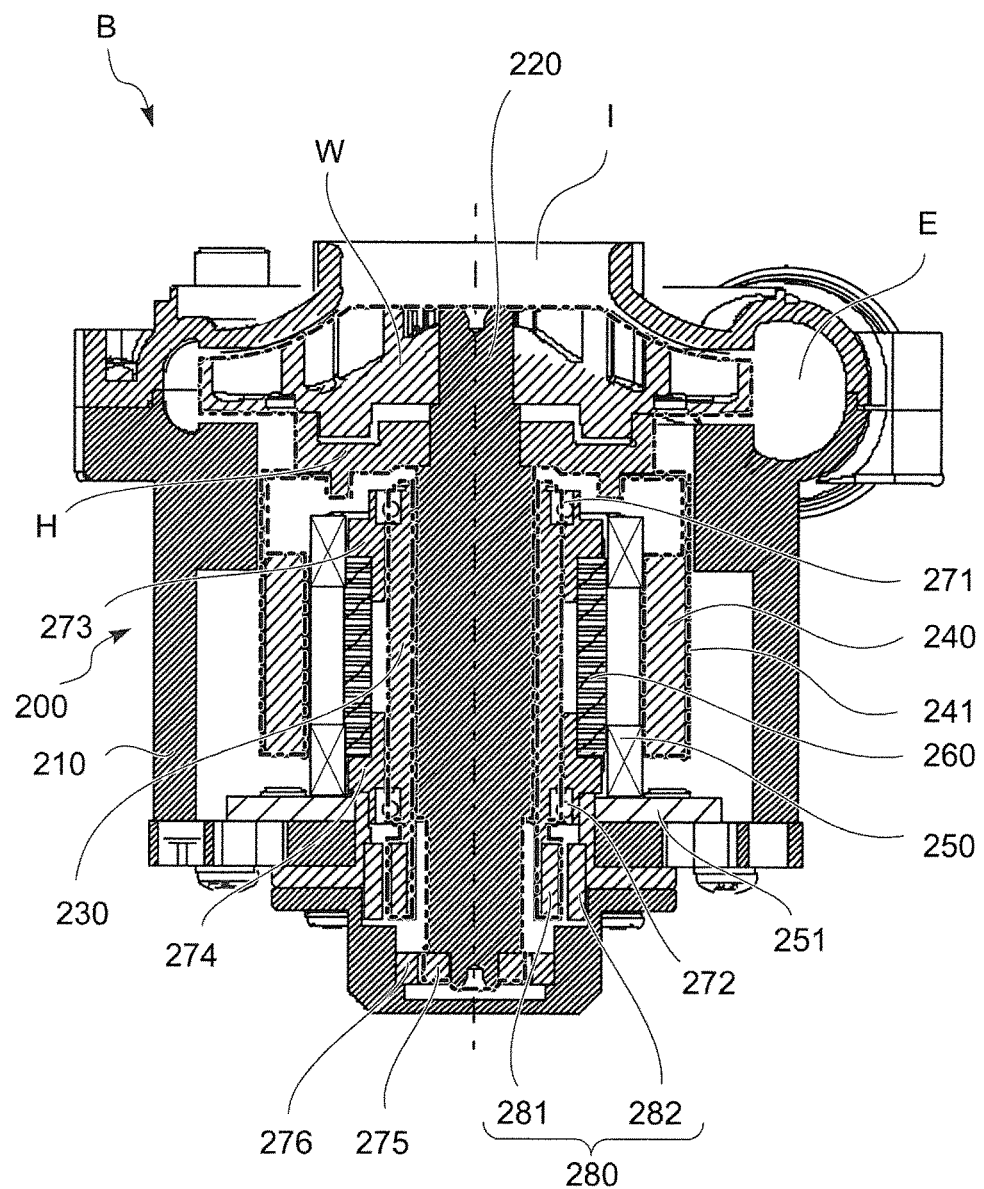
FIG. 7 is a sectional side view illustrating a fan instrument using a motor that is a second embodiment of the present invention.

Next, a fan instrument B using a motor 200 that is a second embodiment of the present invention will be described on the basis of FIG. 7. Here, FIG. 7 is a sectional side view illustrating the fan instrument B using the motor 200 that is the second embodiment of the present invention. The motor 200 as the second embodiment is a modified version of the motor 100 as the first embodiment, wherein the type of the motor is changed from a sleeve rotation type to a shaft rotation type, and many elements are commonly included in both the motor 100 and the motor 200. Thus, the common elements will not be described in detail and will be simply identified with similar numbers in 200s.

As illustrated in FIG. 7, in the motor 200 of the fan instrument B as the second embodiment of the present invention, the impeller W and the hub H are attached so as to integrally rotate with a motor shaft 220. Also, a rotor case 241 is arranged under the hub H and is configured so as to integrally rotate with the motor shaft 220. A rotor magnet 240 is arranged at an inner circumferential side of the rotor case 241 and is configured so as to integrally rotate with the motor shaft 220.

A coil 250 as a stator is arranged at an inner circumferential side of the rotor magnet 240. Also, a yoke 260 is arranged at an inner circumferential side of the coil 250. Ball bearings 271, 271 as auxiliary bearings are respectively held by bearing holders 272, 274, and the bearing holder 273, 274 are attached to the yoke 260. The ball bearings 271, 272 support a sleeve 230 in a rotatable manner with respect to the yoke 260 constituting the stator. The sleeve 230 is arranged around the motor shaft 220.

A movable-side annular magnet 281 as an inner circumferential magnet of a non-contact detent torque generation mechanism 280 is arranged at an outer circumference of the sleeve 230 so as to integrally rotate with the sleeve 230. A fixed-side annular magnet 282 as an outer circumferential magnet of the non-contact detent torque generation mechanism 280 is attached to a case body 210. Also, an inner thrust magnet 275 is arranged at a lower end of the motor shaft 220 in FIG. 7 so as to integrally rotate with the motor shaft 220. On the other hand, an outer thrust magnet 276 is attached to the case body 210 at a position facing the inner thrust magnet 275. As illustrated with the thick alternate long and short dashes line, the motor shaft 220, the impeller W, the hub H, and the inner thrust magnet 275 constitute a first rotor. Also, as illustrated with the thick alternate long and two short dashes line, the sleeve 230, the movable-side annular magnet 281, and inner diameter sides of the ball bearings 271, 272 constitute a second rotor. Accordingly, even though the motor 200 is a shaft rotation-type motor, the same effects achieved with the sleeve rotation-type motor of the above-described first embodiment can be achieved.

LIST OF REFERENCE NUMERALS 100, 200 motor
110, 210 case body 120, 220 motor shaft
130, 230 sleeve (dynamic pressure gas bearing)
140, 240 rotor magnet (magnet)
241 rotor case
150, 250 coil
151, 251 base plate
160, 260 yoke (insulation core)
171, 271 ball bearing (auxiliary bearing)
172, 272 ball bearing (auxiliary bearing)
173, 273 bearing holder
174, 274 bearing holder
175, 275 inner thrust magnet
176, 276 outer thrust magnet
180, 280 non-contact detent torque generation mechanism
181, 281 movable-side annular magnet (inner circumferential magnet)
182, 282 fixed-side annular magnet (outer circumferential magnet)
191 vibration absorbing O-ring
192 vibration absorbing O-ring
B fan instrument
C cover plate
E air exhaustion outlet
H hub
I air suction inlet
N the number of rotations of impeller
Na the number of rotations in the dynamic pressure gas bearing
Nb the number of rotations in the ball bearings
Ta rotation-time viscous friction torque (of the dynamic pressure gas bearing)
Td detent torque (of non-contact detent torque generation mechanism)
Tsa contact friction torque (of the dynamic pressure gas bearing)
Tka adhesion-time contact friction torque (of the dynamic pressure gas bearing)
Tb friction torque (of the ball bearings)
W impeller

The invention claimed is:

1. A motor having a motor shaft that is rotatable with respect to a case body, a coil that is arranged in the case body and generates an magnetic force via energization, a magnet that generates a rotational force by means of an attraction/repulsion force acting between the coil and the magnet, and a dynamic pressure gas bearing that has a sleeve covering a circumference of the motor shaft, wherein auxiliary bearings for the dynamic pressure gas bearing are arranged in series with the dynamic pressure gas bearing, a non-contact detent torque generation mechanism for suppressing the rotation in the auxiliary bearings is arranged in parallel with the auxiliary bearing, and the sum of the magnitude of a predetermined detent torque generated by the non-contact detent torque generation mechanism during a rotation suppression time and the magnitude of a friction torque of the auxiliary bearings is set to be smaller than the magnitude of an adhesion-time contact friction torque generated when the motor shaft and the sleeve adhere to each other of a contact friction torque of the dynamic pressure gas bearing generated due to swing and contact of the motor shaft and the sleeve and is set to be greater than the magnitude of a rotation-time viscous friction torque of the dynamic pressure gas bearing while the motor shaft and the sleeve are spaced from each other.

2. The motor according to claim 1, wherein the non-contact detent torque generation mechanism comprises an inner circumferential magnet whose poles switch in a circumferential direction of the motor shaft and an outer circumferential magnet whose poles switch in the circumferential direction and which is arranged outward with respect to the inner circumferential magnet.

3. The motor according to claim 1, wherein the auxiliary bearings are rolling bearings.

4. The motor according to claim 1, wherein, during the rotation suppression time, the motor shaft does not rotate with respect to the case body and the sleeve rotates with respect to the case body.

5. The motor according to claim 4, wherein vibration absorbing O-rings for absorbing vibration of the motor shaft when the motor shaft rotates are respectively arranged between the case body and the auxiliary bearings.

6. The motor according to claim 1, wherein the non-contact detent torque generation mechanism comprises an inner circumferential magnet whose poles switch in a circumferential direction of the motor shaft and an outer circumferential magnet whose poles switch in the circumferential direction and which is arranged outward with respect to the inner circumferential magnet, and wherein, during the rotation suppression time, the motor shaft does not rotate with respect to the case body and the sleeve rotates with respect to the case body.

7. The motor according to claim 6, wherein vibration absorbing O-rings for absorbing vibration of the motor shaft when the motor shaft rotates are respectively arranged between the case body and the auxiliary bearings.

8. The motor according to claim 1, wherein the auxiliary bearings are rolling bearings, and wherein, during the rotation suppression time, the motor shaft does not rotate with respect to the case body and the sleeve rotates with respect to the case body.

9. The motor according to claim 8, wherein vibration absorbing O-rings for absorbing vibration of the motor shaft when the motor shaft rotates are respectively arranged between the case body and the auxiliary bearings.

* * * * *